US012663779B1

(12) United States Patent
Osterkamp et al.

(10) Patent No.: US 12,663,779 B1
(45) Date of Patent: Jun. 23, 2026

(54) THREE-DIMENSIONAL PRINTING SYSTEM AND METHOD IN COMPLIANCE WITH A CERTIFICATION STANDARD

(71) Applicant: United Services Automobile Association (USAA), San Antonio, TX (US)

(72) Inventors: Bryan J. Osterkamp, New Braunfels, TX (US); Pooja Krishnaswamy, McKinney, TX (US); Nolan Serrao, Plano, TX (US); Kristina Suniga-Cabrera, San Antonio, TX (US); Carol Lyn Lawrence, Fair Oaks Ranch, TX (US); Breanna Nicole Allerkamp, Boerne, TX (US); Courtney Evans, Forney, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 365 days.

(21) Appl. No.: 18/203,531

(22) Filed: May 30, 2023

Related U.S. Application Data

(60) Provisional application No. 63/347,356, filed on May 31, 2022.

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
CPC ...... G05B 19/4099; G05B 2219/49023; B29C 64/118
See application file for complete search history.

(56) References Cited

U.S. PATENT DOCUMENTS

| | | | | |
|---|---|---|---|---|
| 2012/0092724 A1* | 4/2012 | Pettis | .................... | G06F 3/1204 |
| | | | | 358/1.15 |
| 2018/0311890 A1* | 11/2018 | Pettis | ..................... | F16M 11/12 |
| 2019/0016055 A1* | 1/2019 | Kao | ........................ | B33Y 50/00 |
| 2019/0055104 A1* | 2/2019 | Hayes | ................... | B33Y 50/02 |
| 2019/0134910 A1* | 5/2019 | Casey | ................... | G06F 21/608 |
| 2019/0232567 A1* | 8/2019 | Yamazaki | .............. | G09B 23/26 |
| 2022/0179395 A1* | 6/2022 | Blohm | ................... | G06F 3/122 |
| 2022/0308562 A1* | 9/2022 | Norman | ............. | G05B 19/4097 |

* cited by examiner

*Primary Examiner* — Alicia M. Choi
(74) *Attorney, Agent, or Firm* — Fletcher Yoder, P.C.

(57) ABSTRACT

A three-dimensional parts system includes a three-dimensional printer configured to print a part for a consumer and a controller. The controller is configured to receive a request to print the part, determine that the part is qualified for three-dimensional printing in compliance with a certification standard, output a first signal to the three-dimensional printer to initiate printing of the part, output a second signal to prompt the consumer to submit information related to the part, and determine that the part complies with the certification standard based on the information submitted by the consumer.

20 Claims, 6 Drawing Sheets

100

102 — RECEIVE REQUEST FOR PART

104 — IDENTIFY PART IN DATABASE

106 — RETRIEVE DATA FOR PART MANUFACTURE AND INSTALLATION FROM DATABASE

108 — PROVIDE RECOMMENDATION FOR 3D PRINTING OF PART TO CONSUMER

110 — VERIFY PRINTING SYSTEM AND METHOD TO BE USED TO MANUFACTURE PART

150

152 — PROVIDE INSTRUCTIONS FOR PART INSTALLATION TO CONSUMER

154 — PROMPT CONSUMER FOR INPUT REGARDING INSTALLATION OF PART

156 — PROVIDE INCENTIVE TO CONSUMER

THREE-DIMENSIONAL PRINTING SYSTEM AND METHOD IN COMPLIANCE WITH A CERTIFICATION STANDARD

CROSS-REFERENCE TO RELATED APPLICATIONS

This application claims priority to and the benefit of U.S. Provisional Application Ser. No. 63/347,356, entitled "THREE-DIMENSIONAL PRINTING SYSTEM," filed May 31, 2022, which is hereby incorporated by reference in its entirety for all purposes.

BACKGROUND

The present disclosure relates generally to three-dimensional (3D) printing systems. More specifically, the present disclosure relates to systems and methods for generating and providing parts to consumers using 3D printing systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Properties, systems, devices, and other owned articles may be insured by a consumer via one or more insurance companies (e.g., a warranty company). For example, a consumer and an insurance company may enter into an insurance or warranty agreement that covers an article (e.g., product) in which a consumer has an ownership interest. A consumer may insure a house, a car, a cellular device, an appliance, and so forth. In some instances, under the terms of an insurance or warranty agreement, the consumer may submit a request for a new part or a replacement part of the insured property from the insurance company.

For certain systems, products, or devices insured by an insurance company, the insurance company may maintain an inventory or supply of components (e.g., parts) of the systems, products, or devices that the insurance company insures for consumers. After receiving a request for a replacement part of an insured system or device from a consumer, the insurance company may ship the part to the consumer if it is in stock with the insurance company. However, processing, handling, and/or shipping of replacement parts may be time consuming and/or, more importantly, may be susceptible to delays or extended waiting periods for the consumer, especially if the consumer is located in a remote area. In some instances, such as if the manufacturer does not have the part in stock or otherwise readily available, the insurance company may submit an additional request to a manufacturer that manufactures the requested part. The requested part may be manufactured and subsequently sent to the insurance company, which may result in further time delays. Indeed, the time incurred during the processing, handling, and/or shipping of a requested replacement part may coincide with a time during which the system or device for which the requested replacement part is desired is unusable for the consumer. It is now recognized that the process for providing requested replacement parts to consumers may be time consuming and that more efficient procurement of replacement parts for consumers is desired.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a three-dimensional parts system includes a three-dimensional printer configured to print a part for a consumer and a controller. The controller is configured to receive a request to print the part, determine that the part is qualified for three-dimensional printing in compliance with a certification standard, output a first signal to the three-dimensional printer to initiate printing of the part, output a second signal to prompt the consumer to submit information related to the part, and determine that the part complies with the certification standard based on the information submitted by the consumer.

In another embodiment, a three-dimensional parts system includes a three-dimensional printing system configured to print a part for a consumer via a three-dimensional printing process and processing circuitry. The processing circuitry is configured to identify the part in a database having an inventory of available parts qualified for three-dimensional printing in accordance with a certification standard, retrieve data associated with three-dimensional printing of the part from the database based on identification of the part in the database, operate a three-dimensional printer of the three-dimensional printing system to print the part based on the data retrieved from the database, prompt the consumer to input information related to the part, and determine that the part complies with the certification standard based on the information related to the part input by the consumer.

In a further embodiment, a method for three-dimensional printing of a part includes receiving a request to print the part from a consumer, determining that the part is qualified for three-dimensional printing in compliance with a certification standard, operating a three-dimensional printer to create the part, prompting the consumer to submit information related to the part, receiving the information related to the part from the consumer, and determining that the part complies with the certification standard based on the information related to the part received from the consumer.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
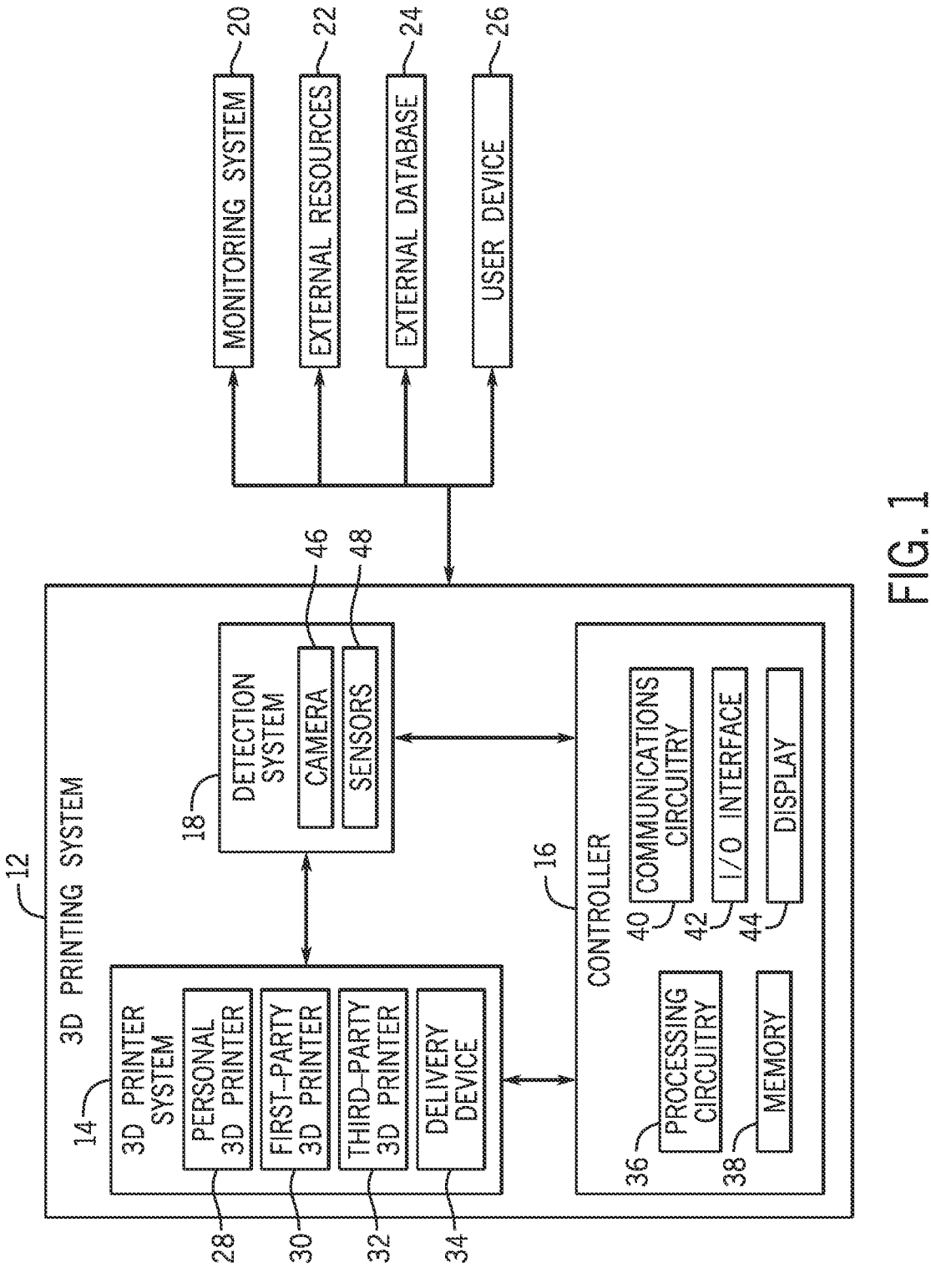
FIG. 1 is a schematic of an embodiment of a three-dimensional (3D) parts system, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As previously mentioned, a consumer (e.g., a user or a member) may insure property associated with the consumer, such as appliances (e.g., washing machine, dryer, water heater), a home, an electronic device, a vehicle, jewelry, and so forth. The varying insured properties may be insured through one or more insurance companies. In some instances, a property may be completely or partially replaced under terms of a warranty or insurance agreement. For example, the property or portions of the property may include one or more parts that may no longer be in condition to serve an intended purpose and may therefore be replaced. In some instances, the parts may be replaced due to updates to the property (e.g., a new version of the property).

As an example, a vehicle (e.g., a property) associated with the consumer may include a headlight (e.g., a part of the property) that functions intermittently or does not power on, and thus, does not operate as intended or expected. The consumer may interface with an insurance company that insures the vehicle and may submit a request for provision of a replacement part for the headlight. In response, the insurance company may undergo a process to procure and/or provide the replacement part to the consumer based on the request. Unfortunately, the process of procuring and/or providing the replacement part to the consumer may be inefficient and time consuming. For example, time may be spent as the insurance company checks an inventory of replacement parts stocked by the insurance company, requests a replacement part from a manufacturer, awaits the replacement part from the manufacturer, processes, handles, and/or ships the replacement part to the consumer, and so forth. The time incurred during procurement and furnishing of the replacement part to the consumer may result in the consumer waiting extended periods, which may coincide with the consumer's inability to utilize the property for which the replacement part is sought. For example, certain properties may be unusable and/or may have reduced utility without the replacement part. Therefore, more efficient procurement and provision of replacement parts to consumers is desired.

Accordingly, the insurance company may utilize a three-dimensional (3D) printing system configured to enable manufacture and supply of replacement parts in a more time-efficient manner. For example, a consumer may own, lease, or otherwise be provided with a 3D printer configured to facilitate efficient 3D printing (e.g., manufacture) of replacement parts for installation with a property of the consumer. In this way, the 3D printer may enable more efficient furnishing of replacement parts to the consumer. For example, replacement parts may be manufactured (e.g., at a location of the consumer) via the 3D printer, thereby reducing reliance on one or more intermediaries that would otherwise be depended upon to procure and deliver the replacement part to the consumer for subsequent installation. In some instances, 3D printers may be owned, leased, or otherwise be provided to other entities (e.g., corporations, businesses, organizations, and so forth) having properties insured by the insurance company. In such instances, the corporations may similarly utilize 3D printers to manufacture replacement parts requested from the insurance company. Thus, reliance on intermediaries that would otherwise be depended upon to procure and deliver the replacement parts to the entities may be reduced. Indeed, utilization of 3D printers to manufacture and provide replacement parts to consumers and/or entities may generally reduce the time traditionally associated with procurement and furnishing of replacement parts by the insurance company.

As will be appreciated, certain properties associated with consumers and/or entities and insured by the insurance company may be subject to one or more regulations, certifications, standards, or other metrics. For example, a quality, integrity, condition, suitability, and/or other metric of a particular property or part (e.g., component) of a property may be evaluated or verified before the insurance company insures the particular property. However, in certain instances, some 3D printed parts may be susceptible to variations in quality, condition, state, or other attribute. For example, variations in conditions associated with a 3D printing process, such as variations in printed material, environmental conditions of the 3D printing process, steps of the 3D printing process, and so forth, may affect a quality or characteristic of the 3D printed part generated via the 3D printing process. Nevertheless, as the 3D printed part may be installed or incorporated with a property to be insured, it is desirable to ensure that 3D printed parts satisfy one or more standards associated with the part and/or the property incorporating the part. In other words, it may be desirable to verify and/or certify a 3D printed part (e.g., a particular article of the 3D printed part) to qualify the property having the 3D printed part for certification (e.g., suitability for insurance coverage).

Accordingly, embodiments of the present disclosure are directed to systems and methods for monitoring and verifying (e.g., certifying) parts constructed via a 3D printing system, which may be operated by the consumer. As described in further detail below, a present embodiment may be configured to enable verification and/or certification of a particular 3D printed part produced via the 3D printing system. In some embodiments, a database may be maintained that identifies certain parts (e.g., replacement parts, types of parts) that have been evaluated and are deemed to qualify for verification or certification. The database may include an identification of the parts, software (e.g., 3D printing instructions) associated with satisfactory manufacture (e.g., 3D printing) of each part, hardware (e.g., 3D printers) associated with satisfactory manufacture of each part, and so forth. Upon request of a replacement part by a consumer, the database may be searched. If the replacement part is identified in the database as qualified for verification or certification, the replacement part may be printed (e.g., via a personal 3D printer of the consumer) and may meet standards for certification (e.g., insurability).

In some embodiments, the monitoring and verification system may include one or more components configured to monitor a 3D printing process performed by a 3D printer. The 3D printing process may be monitored actively or passively. For example, a 3D printing system may include one or more sensors configured to detect the 3D printed part, such as during and/or after the 3D printing process. The one or more sensors may be components of a 3D printer and/or the sensors may be external components separate from the 3D printer. In some embodiments, the monitoring and verification system may include a camera configured to detect a 3D printed part during and/or after a 3D printing process is employed to generate the 3D printed part. The one or more sensors may detect a printed material utilized to print the part, environmental conditions (e.g., temperature, humidity, and so forth) of the 3D printing process, or other parameters that may impact a quality or condition of the 3D printed part. In some cases, the monitoring and verification system may prompt a user for input that is evaluated to determine whether the 3D printed part should be verified or certified. For example, the monitoring and verification system may request that a user submit pictures of the 3D printed part produced via the 3D printing process.

Based on data collected by the monitoring and verification system (e.g., sensor data, user input), the 3D printed part (e.g., a particular article of the 3D printed part) may be evaluated and verified or certified. For example, the data collected by the monitoring and verification system may be compared to baseline data (e.g., standardized data, criterion, threshold values) to determine whether the 3D printed part satisfies standards for verification or certification. In some embodiments, a virtual representation (e.g., a "digital twin") of the part being printed via the 3D printer may be generated, such as during the 3D printing process. As will be appreciated, the digital twin may be readily compared to the baseline data to assess a quality, characteristic, and/or condition of the 3D printed part and to evaluate the 3D printed part for verification or certification. In certain embodiments, the digital twin may also be utilized or referenced (e.g., by the insurance company, by the consumer) to monitor a status or progress of the 3D printing process. In this way, the physical 3D printed part, as well as the process utilized to generate the 3D printed part, may be assessed to evaluate the 3D printed part for certification or verification. Based upon a determination that the 3D printed part satisfies certain standards (e.g., physical standards, procedural standards, development standards, and so forth), the 3D printed part may be marked (e.g., via the 3D printer), such as with a symbol, design, numeral, or other denotation, signifying certification and/or verification of the 3D printed part. In this way, the 3D printed part may be readily identified (e.g., authenticated) as verified and/or as satisfying standards for certification.

In some embodiments, the parts system may monitor one or more factors associated with the insured property, such as environmental conditions near or at a particular location or area (e.g., within a threshold distance from the property) that may impact the insured property and materials suitable for printing parts. In some embodiments, a user device application, such as an application executed on a mobile device, a tablet device, a wearable device, and so forth, associated with the user (e.g., owned or used by the user), may facilitate monitoring of the one or more factors. The mobile phone application may predict replacement parts to print based on the monitored factors being outside a predetermined threshold (e.g., humidity above a predetermined humidity threshold for the area including the insured property). Moreover, the mobile phone application may recommend or predict the materials to use for printing the replacement parts.

In certain embodiments, a consumer may be prompted to provide additional or alternative input. For example, the monitoring and verification system may be configured to present the consumer with one or more questions related to the 3D printing process, the 3D printed part, and/or the property with which the 3D printed part is to be installed. In some cases, the monitoring and verification system may provide the consumer with a guide (e.g., instructions) for facilitating the 3D printing process with the 3D printer, for installing the 3D printed part with the property, and so forth. The consumer may be presented with questions soliciting input regarding procedures followed during the 3D printing process, materials used to print the 3D printed part, actions taken to install the 3D printed part with the insured property, and so forth. In some cases, the consumer may be prompted to submit pictures of the 3D printed part installed with the insured property, and the pictures may be evaluated to assess the quality or condition of the insured property having the 3D printed part. Based on the user input, the monitoring and verification system may evaluate the insured property having the 3D printed part to determine whether the property meets a particular standard (e.g., a standard for insurability), qualifies the consumers for incentives, and so forth.

Accordingly, the techniques disclosed herein and described in further detail below enable more efficient procurement and furnishing of replacement parts to consumers or other entities, while also assessing and verifying that a quality of replacement parts produced by the consumer via a 3D printing process satisfies a desired standard or threshold quality. It should be noted that, although certain embodiments and examples discussed herein may be described as replacement parts for certain types of insured property, the techniques of the present disclosure may be applied to other conditions and/or contexts, such as any context for providing objects (e.g., medical field, real estate field, and so forth). Thus, the presently disclosed embodiments should be understood to be representative real-world examples implementing the present techniques to provide useful context for the discussion and should not be viewed as limiting further applicability of the present techniques. For example, the present disclosure should be understood as being applicable to additional situations in which 3D printing may be utilized, such as for creating housing, prototypes, toys, medical tools and devices, prosthetics, and so forth.

With the foregoing in mind, FIG. 1 is a block diagram of a three-dimensional (3D) parts system 10 (e.g., parts system). In the illustrated embodiment, the 3D parts system 10 includes a 3D printing system 12 having a 3D printer system 14 (e.g., response system, printer system), a controller 16 (e.g., a control system, an automation controller), and detection system 18 (e.g., a monitoring system). The controller 16 may communicate with (e.g., transmit data to and/or receive data from) the 3D printer system 14 and/or the detection system 18. In some embodiments, the detection system 18 may also communicate with (e.g., transmit data to and/or receive data from) the 3D printer system 14. Additionally or alternatively, in some embodiments the detection system 18 may detect one or more operating parameters of the 3D printer system 14, as described in further detail below. As shown, the 3D printing system 12 (e.g., one or more components of the 3D printing system 12) may also communicate with (e.g., transmit data to and/or receive data from) a monitoring system 20 (e.g., an external monitoring system), one or more external resources 22 (e.g., resources), one or more external databases 24 (e.g., databases), and/or one or more user devices 26 associated with a consumer (e.g., user, an entity). It should be understood that the illustrated 3D parts system 10 is merely intended to be exemplary. Indeed, certain features and/or components of the illustrated embodiment may be omitted and/or various other features and/or components may be included in the 3D parts system 10, in accordance with the present techniques. Further, the disclosed systems and components may be arranged in other configurations with respect to one another. For example, one or more of the external databases 24 may be implemented as a component of the 3D printing system 12, one or more user devices 26 may implemented as a component of the 3D printing system 12, and so forth. Similarly, the detection system 18 and/or one or more components of the detection system 18 may be integrated with the 3D printer system 14, the controller 16 may be integrated with the 3D printer system 14, one or more components of the controller 16 and/or the detection system 18 may be implemented separate from the 3D printing system 12, the controller 16 and the detection system 18 may be integrated with one another, and so forth.

The 3D printer system 14 includes one or more components or systems configured to manufacture, generate, construct, or otherwise produce a part (e.g., a physical object, a replacement part, a 3D printed part, etc.) via a 3D printing process or additive manufacturing process. That is, the 3D printer system 14 is configured to create a 3D object (e.g., part) via depositing, joining, and/or adding layers of material to one another to produce the 3D object having a particular geometry, shape, configuration, or other physical property. To this end, the 3D printer system 14 may be configured to apply one or more different materials to generate the 3D object (e.g., part). The 3D printer system 14 may be configured to construct the 3D object (e.g., part) based on control signals, executed instructions (e.g., software), or other signals. As mentioned above, in some embodiments, the 3D printer system 14 may be configured to construct a replacement part requested by a consumer. The 3D printer system 14 may include one or more of a personal 3D printer 28 (e.g., a 3D printer associated with the consumer, owned or leased by the consumer), a first-party 3D printer 30 (e.g., a 3D printer owned by, provided by, accessible by, certified by, or otherwise directly associated with an insurance company), and/or a third-party 3D printer 32 (e.g., a 3D printer provided by a third party, not directly associated with the insurance company, an original equipment manufacturers [OEM] 3D printer). In some embodiments, the third-party of the third-party 3D printer 32 may insure printed 3D parts for the insurance company. That is, the insurance company may send a printing or part request to the third-party 3D printer 32 upon receipt of an insurance claim (e.g., a request for a replacement part) so that the part may be efficiently produced and provided to the consumer (e.g., the part may be printed ahead of time if the part is unavailable in inventory), and quality of the part may be assured or verified by the third-party.

In some embodiments, the 3D printer system 14 may additionally or alternatively include one or more delivery devices 34. The delivery devices 34 may include one or more drones or unmanned aerial vehicles, vehicles, trains, airplanes, mobile printers (e.g., printers inside a moving device or vehicle) and the like, for printing a part, delivering a part, or both. The printers 28, 30, and/or 32 of the 3D printer system 14 may be portable or generally stationary (e.g., static) and may have any suitable shape, size, or other configuration to enable printing of a desired type of part or variety of parts.

The controller 16 may include processing circuitry 36, a memory 38, communications circuitry 40, an input/output (I/O) interface 42, and a display 44. The memory 38 may include one or more tangible, non-transitory, machine-readable media. For example, such machine-readable media can include RAM, ROM, EPROM, EEPROM, optical disk storage, magnetic disk storage or other magnetic storage devices, and/or any other suitable medium configured to carry or store desired algorithms (e.g., program code) in the form of machine-executable instructions or data structures and which may be accessed by and/or executed by the processing circuitry 36 (e.g., one or more microprocessors) and/or by other processor-based devices. In some embodiments, the processing circuitry 36 may include a processing core configured to execute machine-executable instructions and/or algorithms stored in the memory 38. The processing circuitry 36 may include processor-side interfaces for software applications running on one or more processing cores to interact with hardware components, software components, or both, of the 3D parts system 10. The memory 38 may store algorithms (e.g., software, executable instructions) for processing data received by the controller 16. Indeed, the memory 38 may store algorithms, software, and/or executable code to perform any of the techniques, functions, and/or operations described herein.

The communications circuitry 40 is configured to enable the controller 16 and/or components of the controller 16 to interface (e.g., communicate) with other components or systems of the 3D parts system 10. For example, the communications circuitry 40 may enable communications (e.g., exchange of data, control signals, etc.) between the controller 16 and the 3D printer system 14 (e.g., printers 28, 30, and/or 32), the detection system 18, the monitoring system 20, the external resources 22, the external database 24, and/or the user device 26 associated with the consumer. In some embodiments, the communications circuitry 40 may be configured to establish a communications link between the controller 16 and one or more other components of the 3D parts system 10 via a network, such as a personal area network (PAN), a local area network (LAN), a wide area network (WAN), a wired network, a wireless network, and so forth. Accordingly, in some embodiments, the controller 16 may receive and process data (e.g., feedback) from one or more components of the 3D parts system 10 via the communications circuitry 40. Based on the data received, the controller 16 may generate and output control signals and/or instructions to regulate operation of one or more components of the 3D parts system 10. That is, the controller 16 may communicate control signals and/or instructions to other components of the 3D parts system 10 via the communications circuitry 40. Control functions and operations that may be enabled by the controller 16 are described in further detail below.

The I/O interface 42 of the controller 16 may include one or more interfaces that facilitate communication with components of the 3D parts system 10 (e.g., the 3D printer system 14, the detection system 18, the monitoring system 20, the external resources 22, the external database 24, and/or the user device 26), as well as other devices. In some embodiments, the I/O interface 42 may enable communicative coupling between the controller 16 and other peripheral components, such as input devices (e.g., keyboard, mouse), sensors, input/output modules (I/O), output devices (e.g., monitors, alert systems, audio devices, user device 26), and the like. For example, the I/O interface 42 may enable the controller 16 to receive user input or feedback, such as to adjust operation of components of the 3D printing system 12. In some embodiments, the I/O interface 42 may include one or more input devices configured to receive user input, such as one or more buttons, switches, dials, keys, and the like. As another example, the I/O interface 42 may be configured to enable communicative coupling of the controller 16 and an external communications component (e.g., a dongle) that enables communications between the controller 16 and another system or device (e.g., the monitoring system 20, the external database 24, the user device 26, etc.), such as via Wi-Fi, Bluetooth, a cellular network, or other suitable communication protocol or network.

The display 44 may be configured to depict visualizations associated operation of the 3D parts system 10. For example, the display 44 may be configured to output a visualization associated with software or executable code processed by the processing circuitry 36. As described further below, the display 44 may be configured to output guidance (e.g., instructions, guidance instructions) to a user (e.g., a consumer) of the 3D printing system 12, such as suggestions for replacement parts to be constructed, instructions for installing a replacement part with a property or device, recommendations for operating conditions (e.g., environmental conditions) of the 3D printer system 14, instructions for operating the 3D printer system 14, and so forth. In one embodiment, the display 44 may be a touch display (e.g., touchscreen) configured to receive inputs from a user of the controller 16, such as an input to request a part (e.g., replacement part) that may be constructed with the 3D printer system 14. The display 44 may be any suitable type of display, such as a liquid crystal display (LCD), plasma display, or an organic light emitting diode (OLED) display, for example. Additionally, in one embodiment, the display 44 may be provided in conjunction with a touch-sensitive mechanism (e.g., a touchscreen) that may function as part of a control interface (e.g., user interface) of the controller 16.

The detection system 18 is configured to detect one or more operating parameters of the 3D printer system 14. For example, the detection system 18 may include a camera 46 and/or one or more sensors 48. The camera 46 and/or the sensors 48 may detect operation of the 3D printer system 14 (e.g., printers 28, 30, 32, an operational status of the 3D printer system 14), a part constructed by the 3D printer system 14, a material utilized by the 3D printer system 14 to construct the part, and so forth. The camera 46 may be configured to collect still image data and/or video data during operation of the 3D printer system 14, and the data may be evaluated to assess a status (e.g., a completion status) of a part constructed by the 3D printer system 14. As discussed further below, the data collected by the camera 46 and/or sensors 48 may be evaluated to assess a quality, characteristic, and/or condition of the part constructed by the 3D printer system 14. In some embodiments, the sensors 48 may include one or more temperature sensors, humidity sensors, proximity sensors, material sensors, optical sensors, and the like. The detection system 18 (e.g., the camera 46 and/or sensors 48) may also provide additional information or data that may be utilized and/or referenced for other purposes. For example, the detection system 18 may collect data indicative of a number of parts printed by the 3D printer system 14, printing materials used by the 3D printer system 14, or both.

As mentioned above, the 3D parts system 10 in accordance with the present techniques enables more efficient procurement and furnishing of parts (e.g., replacement parts) to consumers, while also enabling assessment and verification of a quality of parts produced via the 3D parts system 10. For example, the 3D parts system 10 may enable evaluation of a part constructed by the consumer with the 3D parts system 10 and verification (e.g., confirmation) that the part satisfies one or more standards or thresholds associated with verification and certification of the part. To this end, the 3D parts system 10 is configured to detect, monitor, and/or evaluate one or more parameters (e.g., operating parameters) of the 3D parts system 10, one or more characteristics or parameters of a part constructed with the 3D parts system 10, input (e.g., data, feedback) received by the 3D parts system 10, or any combination thereof.

In some instances, the 3D parts system 10 may receive a request from a user (e.g., a consumer) that a replacement part is desired. In some instances, the part for which a replacement is requested may be a component of a property (e.g., home, vehicle, appliance) insured by an insurance company for the consumer, and the replacement part may be constructed for installation with the property. The 3D parts system 10 may receive the request for the replacement part from the user in any suitable manner. For example, the user may submit the request for the replacement part via the user device 26. The user device 26 may communicate the request to the controller 16 (e.g., via the communications circuitry 40). Thereafter, the controller 16 may be configured to determine whether the requested replacement part is a type or category of part that may qualify for construction via 3D printing (e.g., for construction via the 3D printer system 14) and subsequent certification. As discussed above, it may be desirable to confirm that a particular part may be manufactured via 3D printing (e.g., by a user) and qualify for subsequent verification and certification to confirm that the property with which the replacement part is to be installed may be insurable (e.g., by the insurance company) once the printed replacement part is installed with the property.

In some embodiments, the controller 16 may search an inventory or database of available parts that may be constructed via the 3D printer system 14 and subsequently qualify for certification. For example, the external database 24 (e.g., a database maintained by the insurance company) may include an inventory of parts that may be manufactured via 3D printing and are certifiable. For each certifiable part listed in the inventory, the external database 24 may also include any associated qualifications or conditions for certification of the part, such as a particular type (e.g., model, characteristic) of the printer 28, 30, 32 to be utilized in constructing the part, software (e.g., instructions, executable code, STL code, G-code, certification data from the insurance company) to be utilized by the 3D printer system 14 to manufacture the part, specified materials (e.g., printer materials) to be utilized in constructing the part, and so forth. The controller 16 may access the external database 24 to search the inventory and determine whether the requested replacement part is listed as a certifiable part that may be manufactured via the 3D printer system 14.

Based on a determination that the requested part is a certifiable part suitable for construction via the 3D printer system 14, the controller 16 may request information (e.g., data) associated with 3D printing of the part. For example, the controller 16 may request that the external database 24 send software (e.g., executable code, STL code, G-code) associated with the part (e.g., associated with a certified printing process for the part) to the controller 16 and/or other data prescribed for certification of the part (e.g., specifications or criteria for the 3D printer system 14). In some embodiments, the controller 16 may receive the requested data from the external database 24 and may store the data locally at the controller 16 (e.g., on the memory 38). In some embodiments, the requested data may be sent to the controller 16 with additional data relevant to certification of the constructed part. For example, the requested data sent to the controller 16 may include certification data provided by and/or originating from the insurance company, suggested operating conditions (e.g., temperature, humidity) for the 3D printing process, prescribed material to be utilized to print the part, instructions (e.g., user instructions, step-by-step instructions) for initiating and completing the 3D printing process, and so forth.

The controller 16 may utilize the data to initiate 3D printing of the part via the 3D printer system 14. For example, the controller 16 may output guidance materials (e.g., step-by-step instructions, an instructional video, etc.) to the user via the display 44. The user may reference the guidance materials to initiate 3D printing of the requested part via the 3D printer system 14. For example, based on the guidance materials, the user (e.g., consumer) may configure the 3D printer system 14 (e.g., a particular one of the printers 28, 30, 32) to utilize a particular material (e.g., printed material) and/or process to manufacture the part, adjust environmental conditions surrounding the 3D printer system 14, and so forth. In some instances, the controller 16 may receive data or feedback (e.g., from the 3D printer system 14, from the detection system 18) indicative of a condition that the user has not satisfied to qualify the part for certification. For example, one of the sensors 48 may detect that the 3D printer system 14 is furnished with an unsuitable material that may disqualify the part from certification. In such circumstances, the controller 16 may output an alert (e.g., via the display 44, via the user device 26) notifying the user that a different printing material should be utilized to qualify the part for certification. The controller 16 may output similar alerts based on detections that improper, incorrect, or unsuitable software (e.g., executable code, STL code, G-code) is sent to the 3D printer system 14 for manufacture of the part and/or that the software is sent to one of the printers 28, 30, 32 that disqualifies the part from certification. In some instances, the controller 16 may be configured to determine that the detection system 18 (e.g., camera 46 and/or sensors 48) is not properly installed or positioned relative to the 3D printer system 14. In response, the controller 16 may output a recommendation (e.g., via the display 44) that a mounting bracket or sensor connector be printed and installed to enable proper installation of the detection system 18. Accordingly, the user may be prompted to address the noncompliance in order to qualify the part for certification via an approved or prescribed system, scheme, or process. Once the user properly configures the 3D printer system 14 to manufacture the requested part according to the established conditions (e.g., as defined by the data in the external database 24), the controller 16 may provide a confirmation that 3D printing of the part may proceed in compliance with the conditions for certification, in some embodiments.

The 3D printing process utilized to construct the part may be monitored, as described above. For example, the detection system 18 (e.g., the camera 46 and/or the sensors 48) may collect data and provide feedback regarding operating parameters of the 3D printer system 14 (e.g., the printers 28, 30, and/or 32), attributes (e.g., physical attributes) of the part printed by the 3D printer system 14, and/or other data indicative of the 3D printing process and/or the part constructed via the 3D printing process. The detection system 18 may provide the data to the controller 16 as feedback. In some embodiments, the controller 16 may compare the data and/or feedback received from the detection system 18 with other data (e.g., baseline data, standardized data) indicative of a standardized embodiment of the part being printed having attributes or characteristics that qualify the part for certification and/or verification. For example, the controller 16 may receive the baseline or standardized data from the external resources 22, the external database 24, or other data source. In such embodiments, the controller 16 may be a component of a monitoring system of the 3D printing system 12 that is configured to monitor the 3D printing process and/or the part being printed by the 3D printer system 14. In some embodiments, the data and/or feedback received by the controller 16 may be communicated or transferred to the monitoring system 20 (e.g., external monitoring system, monitoring system of the insurance company), and the monitoring system 20 may compare the data/feedback collected by the detection system 18 with the baseline data to evaluate the 3D printing process and/or the part being printed. In this way, the 3D parts system 10 may monitor and evaluate the 3D printing process and/or the part being printed to determine whether the part being printed meets criteria for certification and/or validation. The data and/or feedback collected by the detection system 18 may also be stored locally on the memory 38 of the controller 16.

In some embodiments, the controller 16, the monitoring system 20, or both may generate a digital representation (e.g., a virtual representation, a "digital twin") of the part being printed by the 3D printer system 14 based on the data collected by the detection system 18. The digital twin may be displayed as a visual image on the display 44 or other suitable interface to enable a user (e.g., the consumer, the insurance company) to monitor the 3D printing process (e.g., a status of the 3D printer system 14) and progress of the part being printed. Generation of and reference to the digital twin is described in further detail below.

Based on a determination that the part being printed meets criteria defined by the baseline data (e.g., satisfies a threshold quality, defines characteristics meeting or exceeding one or more threshold values), the controller 16, the monitoring system 20, or both may determine that the part being printed qualifies for certification and/or verification. In some instances, the controller 16 may output a control signal to the 3D printer system 14 instructing the 3D printer system 14 to mark or identify the part (e.g., via a label, symbol, tag, code, and/or numerical identifier printed onto the part by the 3D printer system 14) as certified or verified. In other words, the 3D printer system 14 may mark the 3D printed part to indicate that the 3D printed part satisfies, meets, or exceeds certain standards indicative of an acceptable or desired quality of the part. In some instances, the controller 16 may prompt a user (e.g., a consumer), such as via a request displayed on the display 44 and/or communicated via the user device 26, to submit photos of the 3D printed part having the mark or identification indicating that the 3D printed part has been certified by the 3D parts system 10. The user may submit photos of the 3D printed part (e.g., captured via the user device 26) as confirmation that the 3D printed part meets criteria for certification and/or as a quality check. In some cases, the photos submitted by the user may be communicated (e.g., by the user device 26, such as a mobile phone, and/or by the controller 16 via the communications circuitry 40) to the monitoring system 20, the external resources 22, and/or the external database 24 for storage and/or future reference.

The systems and components external to the 3D printing system 12 may provide additional functionality to the 3D parts system 10. For example, the 3D parts system 10 may predict and automatically submit a request to print one or more parts (e.g., replacement parts) via the personal 3D printer 28, the first-party 3D printer 30, and/or the third-party 3D printer 32, for an insured property based on received data (e.g., from the controller 16, from the detection system 18, from the user device 26, from the external resources 22) when the insured property may use or benefit from a replacement part or a new part. In some embodiments, the 3D parts system 10 may predict and automatically submit a request for a printed part at time of impact to an insured vehicle based on data (e.g., location, speed, idling time, unexpected acceleration or braking, fuel consumption, unexpected performance or operations by vehicle, other telematics, and the like) received from the insured property (e.g., sensors of a vehicle). As a further example, the external database 24 may update in real time and may also include historical data related to environmental conditions for the areas in which the 3D printer system 14 is utilized. The external databases 24 may also include historical data related to parts previously printed via the 3D printer system 14 (e.g., by the consumer), and the historical data may be referenced and considered (e.g., by the insurance company, by the controller 16) in making recommendations for printing of a particular part (e.g., another article of the particular part).

The external database 24 (e.g., insurance company database) may also store other data that may be referenced to determine whether it is desirable to print a part via the 3D printing system 12. Data related to consumers, associated insured properties, insurance data for the consumer, and the like, may also be stored in the external database 24. The controller 16 (e.g., processing circuitry 36) may process a predictive algorithm (e.g., stored on the memory 38) and utilize information stored in the external database 24 when requesting parts for 3D printing. That is, the processing circuitry 36 may use the information to determine a present desire or a future desire for parts to be 3D printed. In some embodiments, the processing circuitry 36 may automatically submit a request for printing a part in response to an indication of an unexpected condition at an insured property of the consumer (e.g., water flow within a pipe of the insured home is not within an acceptable threshold for the type of pipe). That is, the processing circuitry 36 may preemptively submit a request for a part based on the historical data.

The external resources 22 may also provide additional data useful in determining when it may be desirable to request and/or print a part via the 3D printing system 12. As mentioned above, the external resources 22 may include one or more data sources external to the controller 16 and the 3D printer system 14. For example, the external resources 22 may include electronic news sources, social media sources, any applications associated with the user device 26 (e.g., installed or used by the user device 26) such as global positioning system (GPS), and the like. The news sources may include various news services that may be updated in real time or near real time via a network. The news sources may provide information regarding weather alerts, natural disaster alerts, unnatural disaster alerts (e.g., traffic incidents, gas leak), and/or any other information that may be published via an electronic news outlet, such as a webpage, news database, or the like. As an example, the external resources 22 may indicate that a natural disaster is approaching a location and/or insured property of the consumer, and the 3D parts system 10 may automatically submit a request for printed parts that may be desired in response to the natural disaster.

Social media sources of the external resources 22 may include social media sites such as Facebook®, Twitter®, and the like. In some embodiments, the social media sources may be associated with the consumer and/or the user device 26 (e.g., a mobile phone, table or computer of the consumer). For example, data from social media sources associated with a location of a user or a destination of the user may be provided to the controller 16. The social media sources may include data trending on social media sites that may not be directly associated with the user or consumer, but that may provide information regarding environmental conditions, such as natural disasters, nearby events, and the like. In some embodiments, the controller 16 may include machine learning algorithms (e.g., stored on the memory 38) that may learn, via various data sets, the likelihood of a part to be requested and thus, may automatically submit a request for one or more printed parts based on data retrieved from the social media sources.

The user device 26 may include devices having one or more sensors capable of detecting location, moisture, temperature, light, physical properties (e.g., potential warping), telematics, counting, tracking, and the like. Examples of the user device 26 include a mobile phone, a computer, a television, a music player, a home security camera, other consumer electronic device, or any combination thereof. In some embodiments, the user device 26 may include image capturing devices (e.g., a camera) that are configured to view or capture audio, still images, and/or video. One or more user devices 26 may be disposed on or near the insured property (e.g., within a threshold distance the property and/or the area). Sensors of the user device 26 may provide useful information related to the condition of some insured properties.

Figure 2:
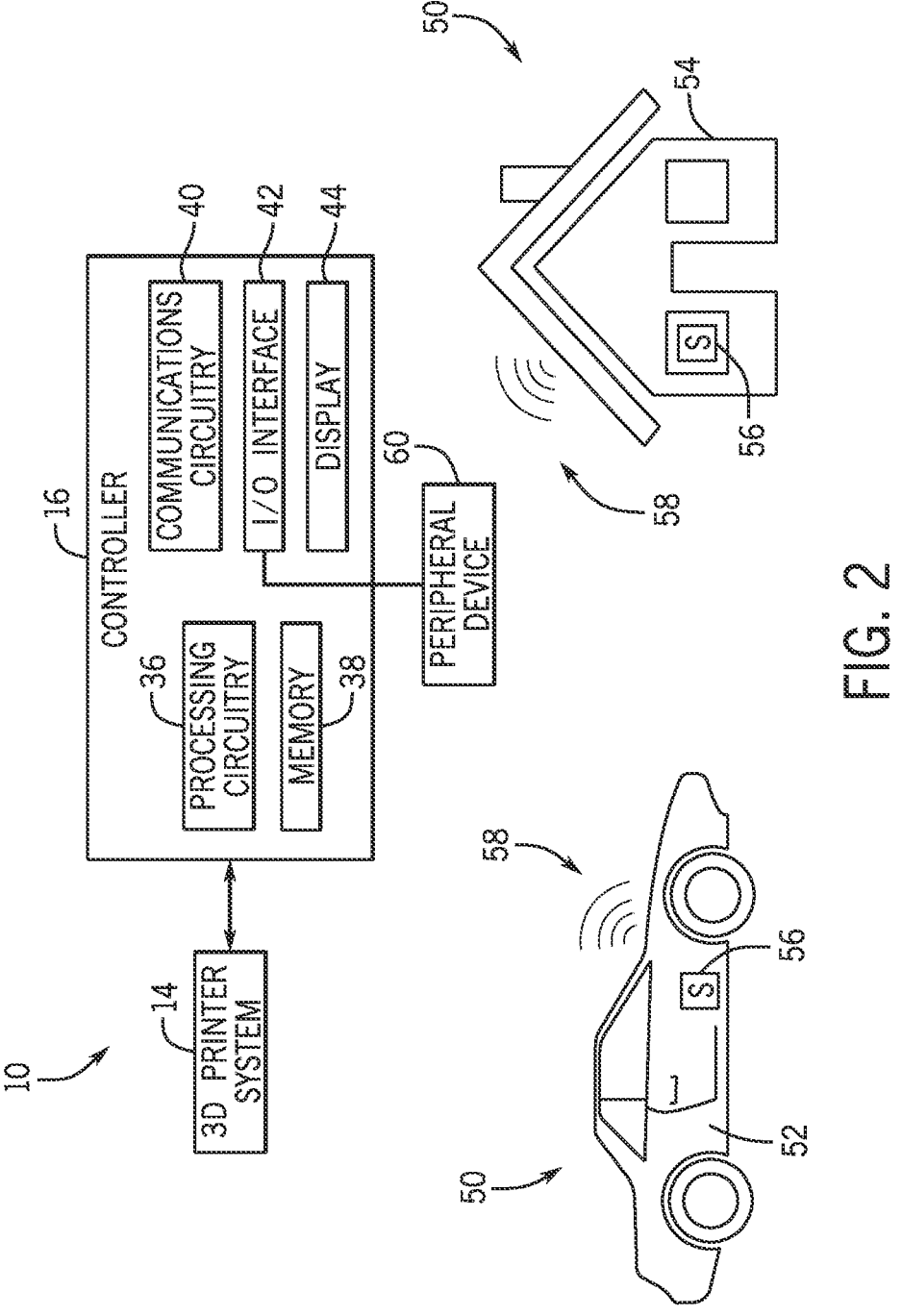
FIG. 2 a schematic of an embodiment of a three-dimensional (3D) parts system configured to receive data initiating a request for a replacement part, in accordance with an aspect of the present disclosure.

FIG. 2 is a schematic of an embodiment of the 3D parts system 10, illustrating the 3D printer system 14, the controller 16, and properties 50 (e.g., insured properties) of a consumer. In particular, the properties 50 include a vehicle 52 and a home 54. As previously discussed, the controller 16 may receive a request for a part (e.g., a replacement part) to be printed from the consumer, such as via the I/O interface 42 and/or via the user device 26 and the communications circuitry 40. Additionally or alternatively, the controller 16 may receive data related to one or more properties 50 associated with the consumer. In the illustrated embodiment, the vehicle 52 and the home 54 each include at least one sensor 56 coupled to and/or otherwise associated with the respective property 50. For example, the sensor 56 associated with the vehicle 52 may be coupled to and/or configured to monitor a headlight of the vehicle 52, an interior trim component of the vehicle 52, an external body piece of the vehicle 52, an acceleration or deceleration of the vehicle 52, or other parameter related to the vehicle 52. As another example, the sensor 56 associated with the home 54 may be coupled to and/or configured to monitor an appliance within the home 54, a structural or decorative feature of the home 54, a home security device of the home 54, or other component of the home 54 for which a replacement part may be desired in certain circumstances. In some embodiments, one or more of the sensors 56 may be associated with the user device 26 and/or the 3D printer system 14 discussed above.

The sensors 56 may be configured to transmit data 58 to the controller 16, and the controller 16 may receive and evaluate the data 58. For example, the data 58 may be indicative of a condition or parameter of the property 50 or a component of the property 50. In some embodiments, the sensors 56 may be configured to detect temperature, pressure, motion, light, sound, moisture, speed, or other parameter that may indicate a status or condition of the property 50. In some instances, the controller 16 may evaluate the data 58 and/or compare the data 58 with other information or data to determine whether a request for a replacement part should be submitted (e.g., to the insurance company). For example, the controller 16 may compare the data 58 with baseline data and/or data indicative of an expected condition of the respective property 50. Based on the comparison, the controller 16 may determine that the data 58 is indicative of an unexpected condition of the property 50 (e.g., a component of the property 50) and that a replacement part is desired for the respective property 50. The controller 16 may also determine which component of the respective property 50 is to be replaced based on the data 58 and thus may determine a particular replacement part to be requested (e.g., for printing via the 3D printer system 14). In some cases, the controller 16 may communicate the request to the monitoring system 20 (e.g., the insurance company) and/or the controller 16 may communicate with the external database 24 to request information related to the requested replacement part. The requested information may include a type of material to be utilized to print the replacement part (e.g., based on the determination of the component to be replaced in or at the property 50), a type of printing process to be utilized by the 3D printer system 14 to construct the replacement part, a particular configuration or geometry of the replacement part to be printed (e.g., a model of the replacement part, STL code associated with the replacement part), a list of parts that may be printed and certified for installation with the property 50, and so forth. In additional or alternative embodiments, the controller 16 (e.g., the processing circuitry 36) may retrieve such information stored in the memory 38.

In some embodiments, the controller 16 may be configured to guide a user through a process of selecting a replacement part to be requested. For example, based on the data 58 received by the controller 16, the controller 16 may present a list of candidate replacement parts to the user. The list of candidate replacement parts may be retrieved from the external database 24 and/or the memory 38 based on evaluation of the data 58, and the list of candidate replacement parts may be displayed for consideration by the user via the display 44. The controller 16 may also be configured to present information related to the data 58 to the user for evaluation. For example, the controller 16 may display a portion of the data 58 indicative of an unexpected condition of the property 50, and the controller 16 may also display expected values of the data 58 for comparison by the user. The comparative data 58 may enable the user to ascertain which replacement part should be requested and/or which replacement parts may be desired. In some embodiments, the list of candidate replacement parts presented by the controller 16 (e.g., via the display 44) may include an indication of which candidate replacement parts are insurable and/or which candidates replacement parts qualify for certification and/or verification (e.g., after manufacture via a certified 3D printing process). Further, the controller 16 may be configured to suggest certain replacement parts to request (e.g., for maintenance of the properties 50, based on historical data associated with the properties 50, based on log of previously-replaced components of the properties 50, etc.).

In certain embodiments, the data 58 output by the sensors 56 may be received by the controller 16 via the communications circuitry 40. However, in some embodiments, it may be desirable to provide the data 58 to the monitoring system 20, the external database 24, or other system external to the controller 16, but the controller 16 (e.g., the communications circuitry 40) may be unable to transmit the data 58 (e.g., due to a temporary interruption in network communication and/ or due to incompatible communication protocols). Accordingly, in some embodiments, the 3D parts system 10 may include a peripheral device 60 (e.g., a dongle, a transmitter) configured to enable transmission of the data 58 and/or other suitable data from the controller 16 to an external system (e.g., of the insurance company). The peripheral device 60 may be configured to communicatively couple to the controller 16 via the I/O interface 42, to the 3D printer system 14, or to another component of the 3D printing system 12. The peripheral device 60 may be configured to receive the data 58 directly from the sensors 56 and/or may be configured to transmit the data 58 received by the controller 16 to an external system (e.g., the monitoring system 20, the insurance company). In some embodiments, the peripheral device 60 may be configured to transmit data (e.g., data 58, data received from detection system 18) to an external system in an encrypted format to increase privacy for the user (e.g., consumer). Additionally or alternatively, data 58 and/or data received from the detection system 18 may be stored in a blockchain.

In the manner set forth above, the controller 16 may automatically submit a request for a replacement part (e.g., to the monitoring system 20, to the insurance company, to the 3D printer system 14) and/or the controller 16 may enable the user to select a replacement part to request. Based on the requested replacement part, the controller 16 may retrieve and/or receive information or data associated with the requested replacement part and communicate the information or data to the 3D printer system 14 to initiate a 3D printing process to construct the replacement part. As discussed above and described in further detail below, the 3D printing process may be monitored, which may enable certification and/or verification of the replacement part printed via the 3D printer system 14. In this way, replacement parts printed via the 3D printer system 14 (e.g., by a consumer) may be provided to the consumer in a more time-efficient manner, and quality of the printed replacement parts may be certified and/or verified. That is, the techniques of the present disclosure enable more efficient procurement of replacement parts for consumers, while also enabling verification that printed replacement parts satisfy desired standards.

Figure 3:
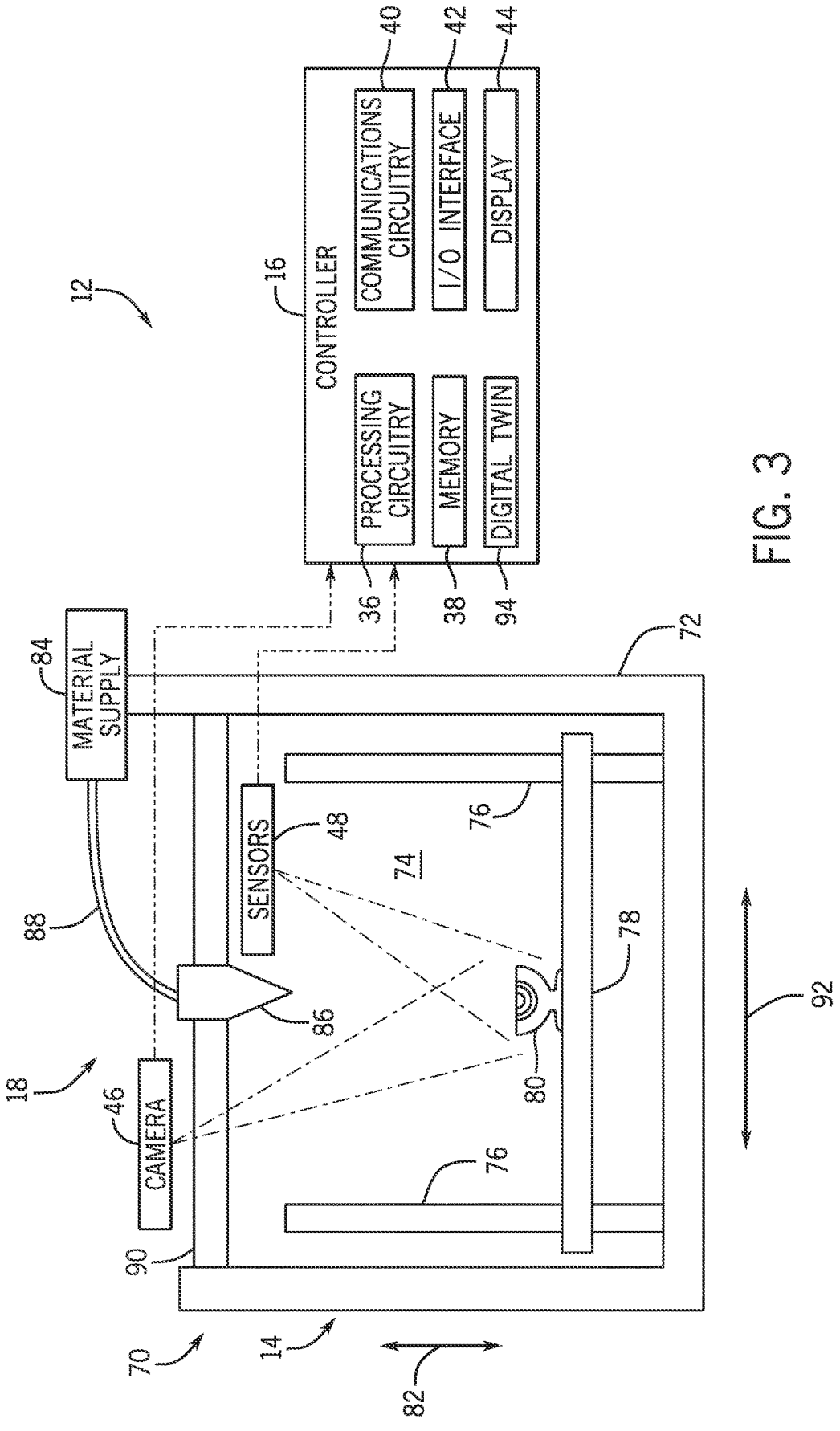
FIG. 3 is schematic of an embodiment of a three-dimensional (3D) parts system configured to monitor a 3D printing process, in accordance with an aspect of the present disclosure.

FIG. 3 is a schematic of an embodiment of the 3D printing system 12, illustrating the 3D printer system 14, the controller 16, and the detection system 18. As shown, the 3D printer system 14 includes a 3D printer 70 (e.g., additive manufacturing system). The 3D printer 70 may be an embodiment of the personal 3D printer 28, an embodiment of the first-party 3D printer 30, an embodiment of the third-party printer 32, or any other suitable 3D printer. The detection system 18 includes the camera 46 and the one or more sensors 48 discussed above. As shown, the camera 46 and/or the one or more sensors 48 may be components of the 3D printer 70, may be integrated with the 3D printer 70, and/or may otherwise be incorporated with the 3D printer 70 (e.g., the 3D printer system 14). In some embodiments, the controller 16 may also be a component of the 3D printer 70 or may otherwise be integrated or incorporated with the 3D printer 70.

The 3D printer 70 includes a housing 72 defining a cavity 74 with a plurality of posts 76 (e.g., support structures, vertical beams, pillars, poles) disposed therein. The posts 76 support a platform 78 on which a part 80 (e.g., replacement part, printed part, 3D printed part) may be constructed via the 3D printing process. During operation, the 3D printer 70 may adjust a position of the platform 78 along the posts 76 (e.g., along a vertical axis 82) to enable application of printed material in a desired form. For example, the platform 78 may be raised and/or lowered along the posts 76 as printed material is deposited in a controlled manner to construct the part 80.

The 3D printer 70 includes a material supply 84 configured to provide material to be printed, thereby forming the part 80 with the printed material. In some embodiments, the 3D printer 70 may include multiple material supplies 84, each configured to contain and provide a different material (e.g., different materials having different properties, characteristics, and/or attributes). The material may be applied or printed via a head 86 (e.g., extruder, nozzle) fluidly coupled to the material supply 84 via a conduit 88. The head 86 may be mounted to or supported by a rail 90 coupled to the housing 72. In some embodiments, the head 86 may be actuated to translate along the rail 90 (e.g., along a lateral axis 92) to enable printing or deposition of the material in different locations to create the part 80 having a desired shape or geometry. As discussed above, the controller 16 may be configured to regulate operation of the 3D printer 70. For example, in the illustrated embodiment, the controller 16 may be configured to control actuation (e.g., movement) of the platform 78, actuation (e.g., movement, material output) of the head 86, and so forth. Indeed, the controller 16 may be configured to control operation of the 3D printer 70 based on data, instructions, software, or other information to produce the part 80 having desired qualities, characteristics, and/or attributes (e.g., shape, hardness, size, and so forth). The data, instructions, software, or other information utilized by the controller 16 to control operation of the 3D printer 70 to produce the part 80 may be received from the external database 24, stored in the memory 38, or both.

The controller 16 may be configured to regulate operation of the detection system 18. In particular, the controller 16 may control operation of the camera 46 and the one or more sensors 48. The controller 16 is also configured to receive data (e.g., feedback) from the camera 46 and the sensors 48. The data provided by the camera 46 and/or the sensors 48 may be indicative of one or more operating parameters of the 3D printing process performed by the 3D printer 70, an operational status of the 3D printer 70, a completion status of the part 80, a parameter associated with the part 80, environmental conditions surrounding the 3D printer 70 and/or the part 80 (e.g., environmental conditions within the cavity 74), and/or other suitable information associated with the 3D printing process. For example, the camera 46 may be configured to capture still photos, video, and or audio of the 3D printing process (e.g., of the part 80). The sensors 48 may include any desirable number and/or any suitable type of sensor 48. For example, the sensors 48 may include temperature sensors, humidity sensors, optical sensors, infrared sensors, light sensors, motion sensors, proximity sensors, current sensors, magnetic sensors, acoustic sensors, and so forth.

The data collected by the camera 46 and the sensors 48 may be provided to the controller 16, and the controller 16 may utilize the data to monitor the 3D printer 70 (e.g., operation of the 3D printer 70), the part 80 (e.g., construction of the part 80), and the 3D printing process generally. For example, data collected by the camera 46 and/or the sensors 48 may be indicative of one or more properties (e.g., physical properties) of the part 80, including, but not limited to, size, physical dimension, material composition, temperature, completion status, color, hardness, density, reflectance, opacity, electric charge, mass and/or weight, permeability, strength, viscosity, electric conductivity and/or resistivity, another suitable parameter, or any combination thereof. The controller 16 may analyze the data and assess compliance with and/or adherence to one or more standards or metrics associated with desirable operation of the 3D printer 70 and/or desirable construction of the part 80. For example, the controller 16 may compare data indicative of qualities, features, and/or characteristics of the part 80 with baseline data (e.g., standardized data) associated with the part 80 to confirm and/or verify that the part 80 being printed meets or exceeds a threshold (e.g., threshold value) associated with quality, characteristic, and/or condition of the part 80. In some embodiments, the baseline data may be provided to the controller 16 from the external database 24, the baseline data may be stored in the memory 38 of the controller 16, or both. For instance, the baseline data may be provided (e.g., to an insurance company, to the external database 24, to the controller 16) by an OEM of the part 80. The baseline data may be indicative of a lower threshold quality or characteristic that the part 80 should meet or exceed to qualify for certification (e.g., by the insurance company and/or the OEM). In some embodiments, the controller 16, the monitoring system 20, or other suitable computing system may be configured to execute a checksum function or checksum algorithm to compare the data associated with the part 80 being printed and collected by the detection system 18 with the baseline data associated with a standard (e.g., a standardized version) of the part 80 to detect deviations or disparities in the part 80 being printed that may preclude certification or verification of the part 80. Thus, the controller 16 may be configured to determine whether the part 80 qualifies for certification based on a comparison of the data collected by the camera 46 and/or sensors 48 (e.g., data associated with the part 80 being printed) to the baseline data. Based on a determination that the part 80 meets or exceeds one or more thresholds or metrics associated with the baseline data, the insurance company may determine that the part 80 (e.g., replacement part) satisfies a requisite standard, qualifies for certification, and is therefore insurable.

The 3D printer 70 and/or the detection system 18 (e.g., camera 46 and/or the sensors 48) may also collect and provide data indicative of operating parameters of the 3D printer 70, such as operating times (e.g., times of day, elapsed times, etc.) of the 3D printer 70, a total number of operating cycles of the 3D printer 70, a total number of parts 80 printed by the 3D printer 70, a type of the parts 80 printed by the 3D printer 70, a type of 3D printing process utilized by the 3D printer 70, installed software of the 3D printer 70, other operating history (e.g., age) of the 3D printer 70, and so forth. Further, the 3D printer 70 and/or the detection system 18 may collect data indicative of operating conditions of the 3D printer 70, such as a temperature of the material printed onto the platform 78 and/or onto the part 80, a temperature of the platform 78, a temperature (e.g., air temperature, environmental temperature) within the cavity 74, a material temperature within the material supply 84, a pressure of the material within the material supply 84, a pressure (e.g., air pressure, environmental pressure) within the cavity 74, a moisture level (e.g., humidity) with the cavity 74, a material composition of the material supplied by the material supply 84, and/or another suitable operating parameter.

The data and/or information collected the detection system 18 may be utilized to generate a virtual representation or digital twin 94 of the part 80, which may be a digital representation of the physical part 80. For example, in some embodiments, the controller 16 (e.g. processing circuitry 36) may be configured to generate the digital twin 94 of the part 80. Additionally or alternatively, the controller 16 may communicate the data and/or information received from the detection system 18 to an external system, such as the monitoring system 20 (e.g., a system of the insurance company), and the external system may generate the digital twin 94. The digital twin 94 may include one or more features or characteristics that represent physical attributes of the part 80, environmental conditions of the 3D printer 70 during printing of the part 80, operating parameters of the 3D printer 70 during printing of the part 80, and so forth. For example, the digital twin 94 may include data indicative of respective printed material properties and/or respective environmental conditions of the 3D printer 70 associated with multiple layers (e.g., printed layers) of the part 80. Thus, analysis of the digital twin 94 may enable a user or administrator to evaluate the 3D printing process over a time horizon of the 3D printing process. For example, the digital twin 94 may enable identification of instances in time during the 3D printing process that desired conditions of the 3D printer 70 and/or the part 80 did not meet a particular standard, as well as identification of one or more printed layers of the part 80 generated during the instances in time. The digital twin 94 may be compared to the baseline data by a user, by the controller 16, by the monitoring system 20, or any combination thereof to assess whether the part 80 being printed should be certified and/or verified.

Moreover, the digital twin 94 may include a visual representation of the part 80, which may be displayed via the display 44 or other suitable display. Based on the data collected by the detection system 18, the visual representation of the digital twin 94 may be updated and displayed in real time or near real time. In this way, printing of the part 80 may be monitored during the 3D printing process. The digital twin 94 may also be utilized to provide other feedback or information, in some embodiments. For example, the controller 16 may be configured to display the visual representation of the digital twin 94 via the display 44 for viewing by a user (e.g., the consumer), and the controller 16 may also output (e.g., simultaneously output) one or more messages with additional information to educate the user about the 3D printing process. In some embodiments, the controller 16 may output an audio signal, a visual description (e.g., text presented on the display 44), or both to describe the 3D printing process, status update information, uses of the part 80, instructions for installing the part 80, an estimated remaining time until printing of the part 80 is complete, and so forth. In this way, the user may be updated and informed about the 3D printing process and the part 80 via the digital twin 94.

As mentioned above, the digital twin 94 may be generated by the controller 16, and in some embodiments the digital twin 94 may be transmitted to an external system by the controller 16 (e.g., via the communications circuitry 40) to an external system, such as the monitoring system 20 or the external database 24. While the digital twin 94 may be a virtual representation of the part 80 being printed, in some embodiments the digital twin 94 transmitted to the external system may include metadata. For example, based on privacy considerations for the consumer, the digital twin 94 transmitted to the external system may include metadata (e.g., instead of other data) to protect the privacy of the consumer. In some embodiments, an output or result of an executed checksum algorithm performed by the controller 16 may be transmitted to the external system. Certain data not utilized by the insurance company to determine and/or confirm certification of the part 80 may not be included in the digital twin 94. In this way, the insurance company may monitor and/or verify that the part 80 being printed satisfies particular standards and qualifies for certification.

Analysis of the data collected by the detection system 18 (e.g., via the controller 16) may also be utilized to generate and provide recommendations or suggestions to a user of the 3D printer 70. Based on comparison of the data to baseline data and/or to standards associated with the 3D printing process and/or the part 80, the controller 16 may generate and output (e.g., via the display 44) a recommended adjustment to the 3D printing process that may be effectuated by the user. For example, based on data detected by the sensors 48 that a temperature and/or a humidity within the cavity 74 deviates from a desired threshold or threshold range (e.g., associated with certification of the part 80), the controller 16 may output a recommendation to adjust environmental conditions of the 3D printer 70 (e.g., increase/decrease an environmental temperature or humidity). As another example, based on a detection by the detection system 18 that the material provided by the material supply 84 and/or a detection that a process (e.g., 3D printing process) performed by the 3D printer 70 may disqualify the part 80 from certification, the controller 16 may output and alert to notify the user and/or to prompt remedial action by the user.

In some embodiments, the controller 16 and/or the monitoring system 20 may be configured to assess qualification of the printed part 80 for certification based on input or data (e.g., supplemental information) in addition to the data collected by the detection system 18. For example, the controller 16 may be configured to prompt a user of the 3D printer 70 (e.g., the consumer) to provide additional information for consideration and/or verification. In one embodiment, the controller 16 may be configured to output a signal requesting that the user answer questions related to the part 80 being printed, operation (e.g., current operation, previous operation) of the 3D printer 70, environmental conditions of the 3D printer 70, and so forth. The questions to be answered by the user may be sent by the controller 16 to the user device 26, may be output to another device via the I/O interface 42, may be displayed for the user via the display 44, or any combination thereof. Based on the input (e.g., answers to the questions) provided by the user, the controller 16 may further assess whether the part 80 and/or the 3D printing process satisfy certain standards or thresholds associated with certification of the part 80. As another example, the controller 16 may operate to prompt the user to submit information, such as photos of the part 80 and/or the 3D printer 70. In some embodiments, photos submitted by the user may be stored at the controller 16 (e.g., in the memory 38), transmitted to the monitoring system 20 (e.g., the insurance company) for assessment, or both.

In accordance with present embodiments, additional techniques may be utilized to determine whether parts 80 qualify for certification (e.g., by the insurance company). In some instances, the part 80 may be one of multiple parts 80 constructed by the 3D printer 70 (e.g., via multiple, separate 3D printing processes) in response to a request for a replacement part or replacement part assembly submitted by a user. For example, multiple parts 80 may be printed and assembled together as a replacement assembly for one of the properties 50. In such cases, each part 80 may be constructed to include a respective feature configured to associate or match with corresponding features of other parts 80. In one embodiment, each part 80 may be printed to include a respective radio-frequency identification (RFID) tag. Based on proper or desired printing of each part 80, the parts 80 may be assembled together, such that the respective RFID tags of each part 80 are arranged in a configuration (e.g., alignment, communicative engagement) that enables confirmation of suitable (e.g., certifiable) construction of the assembly of parts 80 and of the parts individually 80.

In the manner described above, the controller 16, the monitoring system 20, or both may be configured to assess data, information, and/or other input to determine whether the part 80 qualifies for certification. Based on a determination that the part 80 qualifies for certification, the controller 16 may operate the 3D printer 70 to incorporate a marking or identifier into the part 80. For example, the 3D printer 70 may produce (e.g., print) a numerical identifier, insignia (e.g., image associated with the insurance company), emblem, symbol, RFID tag, barcode, QR code, or other detectable element on the part 80 that is associated with certification of the part 80. Accordingly, the printed part 80 may be readily identified (e.g., visually, electronically) as certified (e.g., manufactured in accordance with particular specifications, satisfying a standard of the insurance company).

Once the part 80 is constructed and certified, the controller 16 may output additional information for reference by the user. For example, based on the part 80 requested by the user and printed by the 3D printer 70, the controller 16 may output (e.g., via the display 44, via the user device 26) instructions or guidance for installing the part 80 with the property 50 for which the part 80 was requested. The instructions may include text instructions, representative or sample images of installation, or other information. The controller 16 may also prompt the user to input information related to installation of the part 80. For example, the controller 16 may output one or more questions for answer by the user and/or output a request that the user submit pictures of the installed part 80 with the property 50. Based on the responsive input from the user, the installed part 80 with the property 50 may be evaluated for compliance with standards or tolerances associated with installation of the part 80 with the property 50. In this way, the controller 16 may enable a quality check of the installation of the part 80 constructed for replacement.

The data and information collected by the controller 16 (e.g., from the detection system 18, the 3D printer 70 and/or the user) described above may also be stored for additional purposes. For example, data and information collected during multiple 3D printing processes may be stored (e.g., in the memory 38, in the external database 24, in a log, in a blockchain) for analysis to identify or determine trends that may prompt adjustment of future 3D printing processes and/or adjustment of future guidance provided to the user for subsequent 3D printing processes. Trends may be identified related to models of parts 80, 3D printing processes, printed materials, and/or other specifications. Analysis of one or more trends may prompt adjustments to further improve reliable, consistent 3D printing of parts 80 that satisfy standards for certification and insurability, which further enables more time-efficient procurement and furnishing of replacement parts to consumers.

Figure 4:
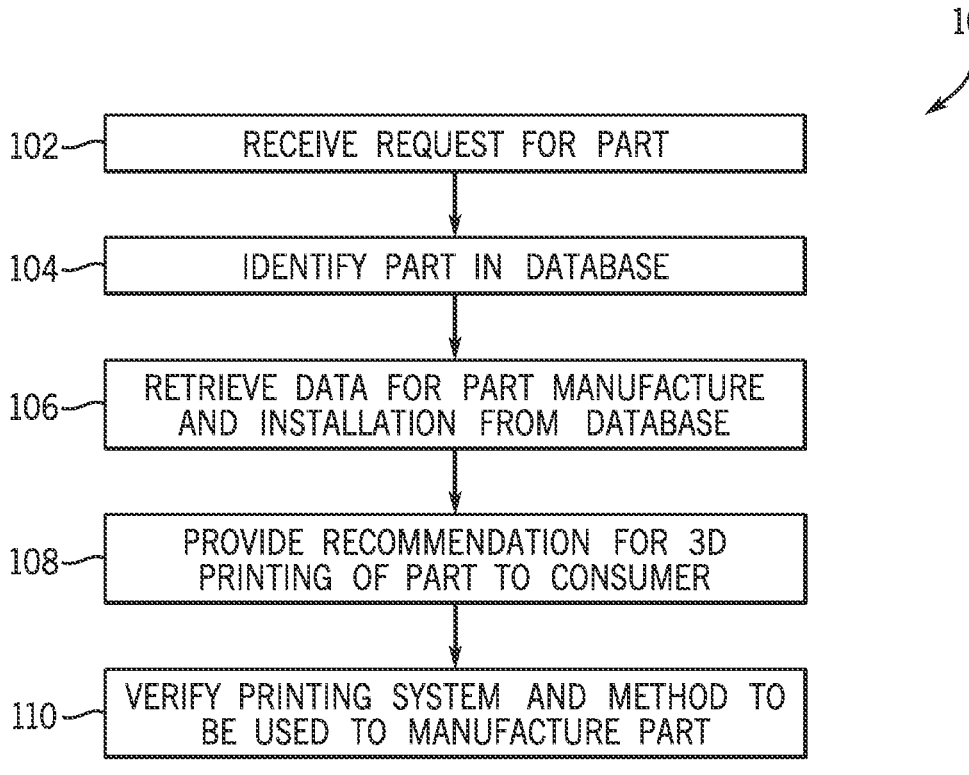
FIG. 4 is a flow diagram of an embodiment of a method for identifying a 3D printed part to be manufactured and verified, in accordance with an aspect of the present disclosure.

FIG. 4 is a flow chart of an embodiment of a method 100 for identifying a 3D printed part to be manufactured and certified in response to a request (e.g., a request for a replacement part) from a user (e.g., a consumer). First, as indicated at block 102, a request for a part is received. For example, the request for the part may be submitted by the user via the user device 26 (e.g., a mobile phone). The request may be received by the controller 16 of the 3D printing system 12, the monitoring system 20, or other system (e.g., a system of the insurance company). As indicated by block 104, the part may be identified in a database, such as the external database 24. The requested part may be identified based on the property 50 with which the part is to be implemented or installed. As discussed above, the external database 24 may maintain a list of properties 50 and associated parts that may be printed via a 3D printing process, including an indication of parts that may be certified (e.g., insurable). In some embodiments, the user may access or otherwise be presented with the list of properties 50 (e.g., stored in the external database 24), and the user may select the property 50 for which the replacement part was requested. In some embodiments, the 3D parts system 10 may guide the user through a process of selecting a part that may be 3D printed and may be certified and insurable. The 3D parts system 10 may guide the user through a selection process based on properties 50 of the consumer that are insured by the insurance company, maintenance histories of the properties 50, recorded or detected events or conditions of the properties 50, information received via external resources 22, and so forth.

Once the part is identified in the database, data for manufacture (e.g., 3D printing) of the part and installation of the part (e.g., with the property 50) may be retrieved, as indicated by block 106. For example, the data may be transmitted from the external database 24 to the controller 16 of the 3D printing system 12. The data may include software (e.g., STL code, G-code, executable instructions) for operating the 3D printer 70 to construct the part, operating the controller 16, providing instructions or guidance to the user, requesting input or information from the user, and so forth. In some embodiments, the method 100 also includes providing one or more recommendations for 3D printing of the part to the user (e.g., consumer), as indicated by block 108. For example, the controller 16 may be configured to output recommendations (e.g., via the display 44, via the user device 26) for printed materials used to construct the part, operating conditions for the 3D printer (e.g., environmental conditions), a type of the 3D printer to use for printing of the part, and so forth. The recommendations output to the consumer may be based on standards or criteria for certification of the printed part.

As indicated by block 110, the method 100 also includes a step of verifying the 3D printer system 14 (e.g., 3D printer 70) to be utilized to construct the part and verifying a method (e.g., 3D printing process) to be utilized to construct the part via 3D printing. In this way, the method 100 may establish a basis for certification of the part. To this end, in some embodiments, the user may register the 3D printer 70 (e.g., personal 3D printer 28) with the insurance company to enable verification that the 3D printer 70 meets certain qualifications for printing parts of certifiable quality. Verification of the 3D printer system 14 and/or the method (e.g., 3D printing process) may be based on any suitable factor(s), such as the type of 3D printer 70 to be utilized, an age of the 3D printer 70, a current operating software of the 3D printer 70, compatibility of the 3D printer 70 and/or 3D printing process with the part to be printed, potential qualification of the part for certification, and so forth. In some embodiments, a notification may be output to the consumer (e.g., via the display 44 and/or the user device 26) confirming verification of the 3D printer system 14 and the method (e.g., 3D printing process) to be utilized to construct the part. As a result, a basis for certification of the printed part may be established and communicated to the user prior to initiation of the 3D printing process.

Figure 5:
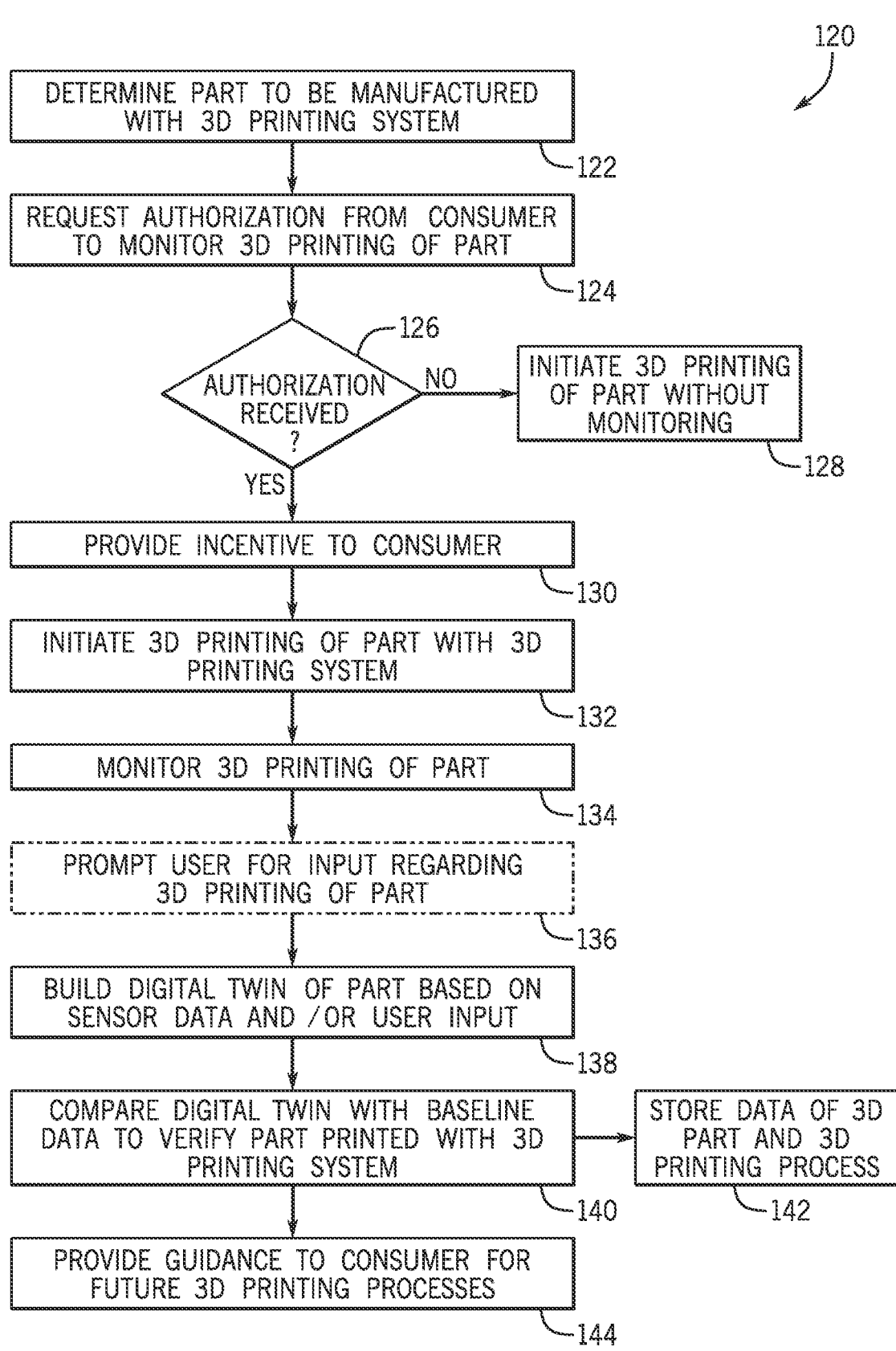
FIG. 5 is a flow diagram of an embodiment of a method for monitoring a 3D printing process and verifying a 3D printed part, in accordance with an aspect of the present disclosure.

FIG. 5 is a flow chart of an embodiment of a method 120 for monitoring a 3D printing process and verifying a 3D printed part, in accordance with the present techniques. The method 120 may begin with determining a part to be manufactured by the 3D printer system 14, as indicated by block 122. The part to be manufactured may be determined based on a request for the part submitted by a consumer, data referenced in the external database 24, information provided by the insurance company, and/or other suitable input.

The method 120 may also include requesting authorization from the consumer to monitor 3D printing of the part, as indicated by block 124. For example, the insurance company may prompt the request for authorization from the consumer to monitor the 3D printing process. In some embodiments, the request may be a request to actively monitor the 3D printing process, such as based on real-time or near real-time data collected by the 3D printer 70 and/or the detection system 18. Active monitoring of the 3D printing process may include transmitting collected data to the monitoring system 20 (e.g., via the controller 16). In some embodiments, the consumer may provide authorization to monitor the 3D printing process via an input received at the display 44 and/or the user device 26.

At block 126, a determination is made regarding whether authorization to monitor the 3D printing process is received from the consumer. If authorization is not received from the consumer, the method 120 may proceed with initiating 3D printing of the part without monitoring (e.g., without active monitoring) of the 3D printing process, as indicated at block 128. In some embodiments, if authorization is not provided by the consumer, the 3D printing process may proceed with limited monitoring (e.g., passive monitoring). For example, certain aspects of the 3D printing process may be monitored if the part to be printed will be printed via a process (e.g., software) enabled or provided by the insurance company and/or if the 3D printer 70 is provided to the consumer by the insurance company (e.g., at a reduced cost to the consumer).

If authorization is received from the consumer, an incentive may be provided to the consumer, as indicated at block 130. For example, if the consumer authorizes monitoring, such as active monitoring, of the 3D printing process, the insurance company may provide one or more incentives to the consumer. Incentives provided to the consumer may include financial discounts, reduced insurance premiums, availability of a warranty, and/or other service offerings.

The method 120 may proceed to block 132, and 3D printing of the part with the 3D printing system 12 may be initiated. For example, the controller 16 may transmit software (e.g., STL code, G-code) to the 3D printer system 14, initiate operation of the detection system 18, control operation of the 3D printer system 14, and so forth. The 3D printing process may be monitored, as indicated by block 134. For example, the controller 16 may receive data and information from the 3D printer system 14, from the detection system 18 (e.g., camera 46 and/or sensors 48), and/or from other suitable sources of data. Aspects of the 3D printing process that may be monitored include operating parameters of the 3D printer 70, conditions (e.g., environmental conditions) of the 3D printer system 14, attributes or parameters of the part being printed, and so forth. The data and/or information received by the controller 16 may be transmitted to the monitoring system 20 (e.g., external monitoring system), such as for assessment by the insurance company.

In some embodiments, the method 120 includes prompting a user (e.g., the consumer) for input regarding the 3D printing process, as indicated by block 136. For example, the controller 16 may output requests for the user to answer questions related to the 3D printing process, provide additional data (e.g., photos) of the 3D printing process (e.g., the 3D printer 70 and/or printed part), or other information that may be utilized to assess whether the printed part qualifies for certification.

The method 120 further includes, at block 138, building or generating a digital twin of the printed part based on sensor data (e.g., collected by sensors 48, the camera 46) received by the controller 16, based on user input (e.g., photos), or both. In some embodiments, the digital twin may be generated based on information or data received from the 3D printer 70. The digital twin may be a virtual representation of the printed part and may be referenced during and/or after the 3D printing process to assess characteristics or parameters of the printed part, as well as details regarding the 3D printing process. In some instances, the digital twin may be transmitted to an external system, such as the monitoring system 20, for reference by the insurance company or another party. The digital twin of the printed part may be compared with baseline data associated with the part or a type of the part being printed, as indicated at block 140. For example, the controller 16, the monitoring system 20, or both may compare the digital twin with the baseline data to determine whether the printed part satisfies one or more standards or criteria for certification and/or verification. In some embodiments, the printed part may be marked or identified via a feature (e.g., symbol, identifier, barcode, insignia) indicating that the part is certified based on evaluation of the data collected by the controller 16 (e.g., digital twin).

The data collected by the controller 16 (e.g., from the detection system 18 and/or the 3D printer 70) may be stored in the memory 38, the monitoring system 20, and/or the external database 24, as indicated by block 142. The stored data may be referenced by the insurance company or other entity to evaluate part models, 3D printing processes, or other aspects of the 3D parts system 10. For example, the stored data may be compared with additional store data to identify trends in 3D printing processes, which may prompt adjustments to improve future 3D printing of replacement parts.

The method 120 may also include providing guidance to the consumer for future 3D printing processes, as indicated by block 144. In some embodiments, the controller 16 may output recommendations and/or suggestions to the consumer for adjusting parameters of the 3D printer 70, an environment of the 3D printer 70, or other aspects of the 3D printing process to enable improvements in future 3D printing processes. The controller 16 may additionally or alternatively output recommendations and/or suggestions to the consumer for adjusting parameters of the 3D printer 70, an environment of the 3D printer 70, or other aspects of an existing, current, or ongoing 3D printing process. For example, the guidance may be communicated to the consumer via the display 44, the user device 26, or other suitable system.

Figure 6:
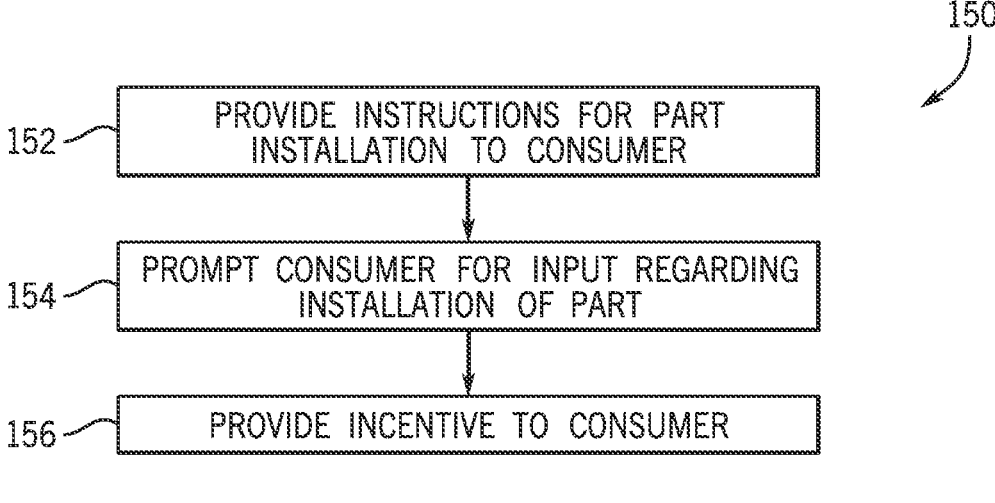
FIG. 6 is a flow diagram of an embodiment of a method for verifying an installation of a 3D printed part, in accordance with an aspect of the present disclosure.

FIG. 6 is a flow chart of an embodiment of a method 150 for verifying an installation of a 3D printed part. As indicated by block 152, the method 150 includes providing instructions (e.g., guidance) for installation of the printed part to the consumer. For example, the controller 16, the monitoring system 20, or both may output information for reference by the consumer after the part is printed and certified via the 3D printer 70. The information may include text instructions, reference photos, or other information that may guide the consumer to property install the printed part in a system (e.g., property 50) for which the part was requested. As indicated by block 154, the consumer may be prompted to provide input regarding installation of the part. For example, the consumer may be prompted to answer questions related to installation of the part, submit pictures of the installed part, or provide other information that may be evaluated to assess the installation of the part. As indicated by block 156, the method 150 may also include providing an incentive to the consumer. For example, an incentive may be provided to the consumer based on submission of one or more types of input by the consumer, based on a compliance of the installation of the part with one or more standards (e.g., evidenced by the input from the consumer), and so forth. Incentives provided to the consumer may include financial discounts, reduced insurance premiums, availability of a warranty, and/or other service offerings.

As described in detail above, the embodiments and techniques of the present disclosure enable more efficient procurement and furnishing of replacement parts to consumers, while also assessing and verifying that a quality of replacement parts produced by the consumer satisfies a desired standard or threshold quality. In particular, present embodiments are configured to enable identification of parts that may be constructed via a 3D printing process, monitoring of the 3D printing process utilized to construct the part, as well as verification and/or certification of a particular 3D printed part produced via a 3D printing system. Thus, the present techniques enable more efficient procurement and furnishing of replacement parts for consumers, while also enabling assessment and verification of printed parts to confirm that the printed parts satisfy desired standards and criteria.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure.

Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A three-dimensional parts system, comprising:
a three-dimensional printer configured to print a part for a consumer; and
a controller configured to:
receive a request to print the part;
determine that the part is qualified for three-dimensional printing in compliance with a certification standard;
output a first signal to the three-dimensional printer to initiate three-dimensional printing of the part;
output a second signal to prompt the consumer to submit information related to the part;
output a third signal to identify completion of the three-dimensional printing of the part;
determine that the part complies with the certification standard based on the information related to the part submitted by the consumer; and
output instructions for installing the part in response to the identified completion of the three-dimensional printing of the part and the determination that the part complies with the certification standard.

2. The three-dimensional parts system of claim 1, wherein the information related to the part comprises three-dimensional printer operation information, environmental condition information, part installation information, a photo of the part, or any combination thereof.

3. The three-dimensional parts system of claim 1, wherein the controller is configured to output a fourth signal to display guidance instructions for the consumer.

4. The three-dimensional parts system of claim 3, wherein the guidance instructions comprise instructions to adjust an operating parameter of the three-dimensional printer.

5. The three-dimensional parts system of claim 1, wherein the controller is configured to determine that the part is qualified for the three-dimensional printing in compliance with the certification standard based on an identification of the part in a database comprising an inventory of available parts qualified for certification.

6. The three-dimensional parts system of claim 5, wherein the controller is configured to receive data associated with the three-dimensional printing of the part from the database based on the identification of the part in the database.

7. The three-dimensional parts system of claim 6, wherein the data comprises software associated with the three-dimensional printing of the part, a type of three-dimensional printer associated with the three-dimensional printing of the part, a specified material to be utilized in the three-dimensional printing of the part, or any combination thereof.

8. The three-dimensional parts system of claim 6, wherein the data comprises software associated with the three-dimensional printing of the part, and wherein the controller is configured to operate the three-dimensional printer to print the part based on the software.

9. The three-dimensional parts system of claim 1, wherein the controller is configured to transmit the information related to the part submitted by the consumer to an external database.

10. The three-dimensional parts system of claim 1, wherein the controller is configured to receive the request to print the part via an interface of the controller, via a user device separate from the controller, or both.

11. The three-dimensional parts system of claim 1, wherein the controller is configured to output a fourth signal to prompt the consumer to submit a photo of the installation of the part.

12. A three-dimensional parts system, comprising:

a three-dimensional printing system configured to print a part for a consumer via a three-dimensional printing process; and processing circuitry configured to:

identify the part in a database comprising an inventory of available parts qualified for three-dimensional printing in accordance with a certification standard;

retrieve data associated with three-dimensional printing of the part from the database based on identification of the part in the database;

operate a three-dimensional printer of the three-dimensional printing system to print the part based on the data retrieved from the database;

prompt the consumer to input information related to the part;

identify completion of the three-dimensional printing of the part;

determine that the part complies with the certification standard based on the information related to the part input by the consumer; and output instructions for installing the part in response to the identified completion of the three-dimensional printing of the part and the determination that the part complies with the certification standard.

13. The three-dimensional parts system of claim 12, wherein the processing circuitry is configured to search the database to identify the part in response to receipt of a request to print the part from the consumer.

14. The three-dimensional parts system of claim 13, wherein the processing circuitry is configured to receive the request to print the part from the consumer via an interface of a controller of the three-dimensional printing system, via a user device of the consumer, via an external monitoring system, or any combination thereof.

15. The three-dimensional parts system of claim 12, wherein the processing circuitry is configured to output guidance instructions for the consumer, wherein the guidance instructions comprise recommendations for a printing material to print the part, a type of the three-dimensional printer to use for the three-dimensional printing of the part, operating conditions for the three-dimensional printer, or any combination thereof.

16. The three-dimensional parts system of claim 15, wherein the guidance instructions are based on the certification standard.

17. The three-dimensional parts system of claim 12, wherein the information related to the part comprises three-dimensional printer operation information, environmental condition information, part installation information, a photo of the part, or any combination thereof.

18. A method for three-dimensional printing of a part, comprising:

receiving a request to print the part from a consumer;

determining that the part is qualified for three-dimensional printing in compliance with a certification standard;

operating a three-dimensional printer to create the part;

prompting the consumer to submit information related to the part;

identifying completion of the creation of the part;

receiving the information related to the part from the consumer;

determining that the part complies with the certification standard based on the information related to the part received from the consumer; and providing instructions for installing the part in response to the identified completion of the creation of the part and the determination that the part complies with the certification standard.

19. The method of claim 18, wherein determining that the part is qualified for the three-dimensional printing in compliance with the certification standard comprises identifying the part in a database comprising an inventory of available parts qualified for the three-dimensional printing in accordance with the certification standard.

20. The method of claim 18, comprising:

providing guidance instructions to the consumer, wherein the guidance instructions comprise recommendations for a printing material to print the part, a type of the three-dimensional printer to use for the three-dimensional printing of the part, operating conditions for the three-dimensional printer, or any combination thereof.

\* \* \* \* \*